United States Patent
Araki et al.

(10) Patent No.: US 10,110,150 B2
(45) Date of Patent: Oct. 23, 2018

(54) PRIMARY MAGNETIC FLUX CONTROL METHOD

(71) Applicant: DAIKIN INDUSTRIES, LTD., Osaka-shi, Osaka (JP)

(72) Inventors: Takeshi Araki, Kusatsu (JP); Naoto Kobayashi, Kusatsu (JP); Nobuki Kitano, Kusatsu (JP)

(73) Assignee: DAIKIN INDUSTRIES, LTD., Osaka-Shi (JP)

( * ) Notice: Subject to any disclaimer, the term of this patent is extended or adjusted under 35 U.S.C. 154(b) by 415 days.

(21) Appl. No.: 14/439,251

(22) PCT Filed: Oct. 8, 2013

(86) PCT No.: PCT/JP2013/077365
§ 371 (c)(1),
(2) Date: Apr. 29, 2015

(87) PCT Pub. No.: WO2014/069188
PCT Pub. Date: May 8, 2014

(65) Prior Publication Data
US 2015/0311846 A1    Oct. 29, 2015

(30) Foreign Application Priority Data

Oct. 31, 2012  (JP) .................................. 2012-240326

(51) Int. Cl.
*H02P 21/06* (2016.01)
*H02P 23/14* (2006.01)
(Continued)

(52) U.S. Cl.
CPC ............ *H02P 21/141* (2013.01); *H02P 21/06* (2013.01); *H02P 21/14* (2013.01); *H02P 23/14* (2013.01); *H02P 27/06* (2013.01); *Y02P 80/116* (2015.11)

(58) Field of Classification Search
CPC ......... H02P 21/141; H02P 21/06; H02P 21/14
(Continued)

(56) References Cited

U.S. PATENT DOCUMENTS 4,814,677 A * 3/1989 Plunkett .................... H02P 6/08
                                                    318/400.02
5,153,491 A * 10/1992 Fujioka ................ G05B 19/416
                                                    318/571
(Continued)

FOREIGN PATENT DOCUMENTS

JP    4-91693 A      3/1992
JP    2003-259680 A  9/2003
(Continued)

OTHER PUBLICATIONS

Hotta et al., "Method of controlling Position Sensorless DC brushless motor," Tokai-Section Joint Conference of the Institutes of Electrical and Related Engineers, 1988, p. 161, with a partial English translation.
(Continued)

*Primary Examiner* — Eduardo Colon Santana
*Assistant Examiner* — Devon Joseph
(74) *Attorney, Agent, or Firm* — Birch, Stewart, Kolasch & Birch, LLP

(57) ABSTRACT

A primary magnetic flux command value is changed in accordance with a torque of a rotary electric motor to control a current phase of an armature current with respect to a q axis that advances by $\pi/2$ with respect to a d axis in phase with a field flux to be a desired phase in accordance with the torque.

8 Claims, 9 Drawing Sheets

(51) Int. Cl.
*H02P 27/06* (2006.01)
*H02P 21/14* (2016.01)

(58) Field of Classification Search
USPC .......................................................... 318/717
See application file for complete search history.

(56) References Cited

U.S. PATENT DOCUMENTS

| | | | | |
|---|---|---|---|---|
| 5,459,386 | A | * | 10/1995 | Okachi ................... H02P 21/09 318/721 |
| 5,659,235 | A | | 8/1997 | Yamada et al. |
| 6,194,864 | B1 | * | 2/2001 | Kinpara ................... H02P 21/12 318/805 |
| 2008/0191656 | A1 | * | 8/2008 | Satake ................ B60L 11/1803 318/722 |

FOREIGN PATENT DOCUMENTS

| | | |
|---|---|---|
| JP | 3672761 B2 | 7/2005 |
| JP | 2009-124811 A | 6/2009 |
| JP | 4531751 B2 | 8/2010 |

OTHER PUBLICATIONS

Kaku et al., "A Novel Technique for a DC Brushless Motor Having No Position Sensors," T. IEE Japan Transaction on Industry Applications, vol. 111-D, No. 8, 1991, pp. 639-644, with an English abstract.

Kaku et al., "A Novel Technique for a DC Brushless Motor Having No Position-Sensors," Tokai-Section Joint Conference of the Institutes of Electrical and Engineers, 1990, p. 172, with a partial English translation.

Takeda et al., "Design and Control of Interior Permanent Magnet Synchronous Motor," Ohmsha, 2001, pp. 23-26, with a partial English translation.

Urita et al., "Constant estimation method for synchronous machines with the primary magnetic flux controlled," Tokai-Section Joint Conference of the Institutes of Electrical Engineers, 1998, p. 101, with a partial English translation.

Urita et al., "On General Purpose Inverter for Synchronous Motor Drive," T. IEE Japan Transaction on Industry Applications, vol. 119-D, No. 5, 1999, pp. 707-712, with an English abstract.

Yabe et al., "A Sensor-less Drive of IPM Motor with Over-modulation PWM," The papers of Joint Technical Meeting on Rotating Machinery, IEE Japan, 2001, pp. 7-12, with an English abstract.

* cited by examiner

F I G . 3
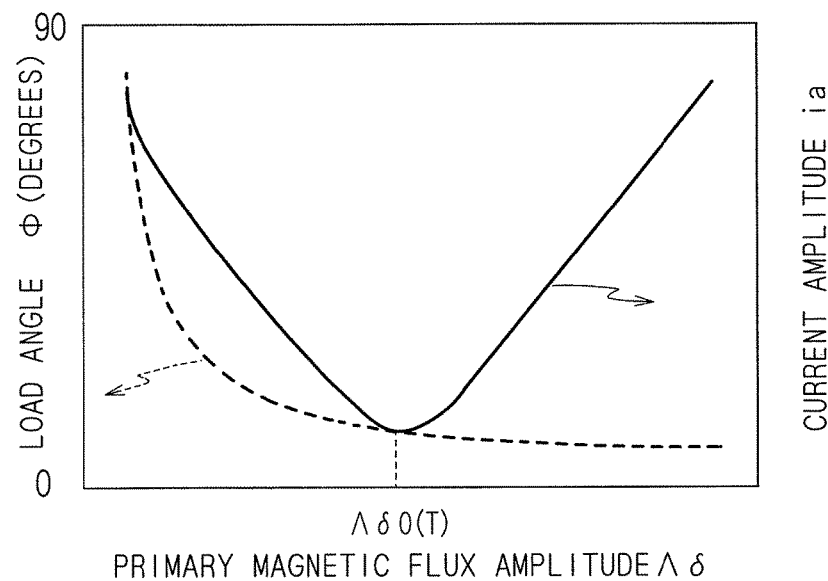
F I G . 4
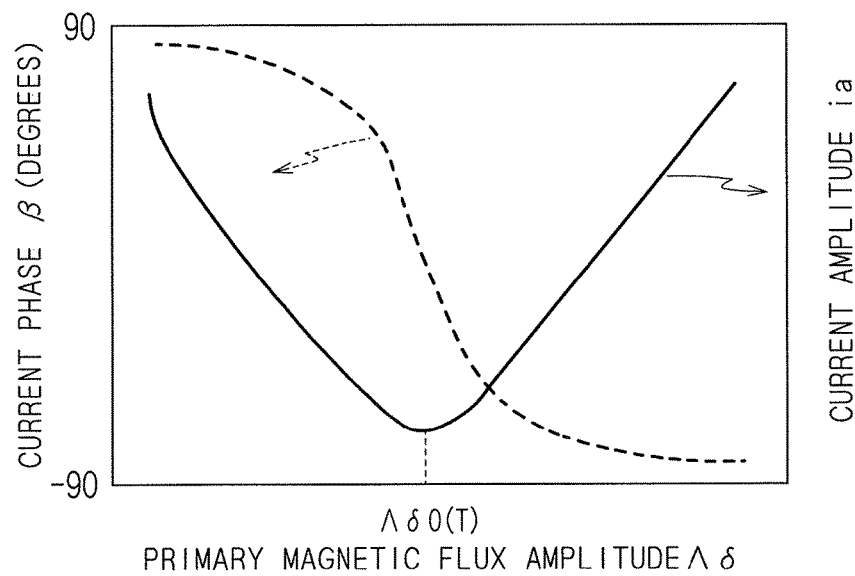

F I G. 7
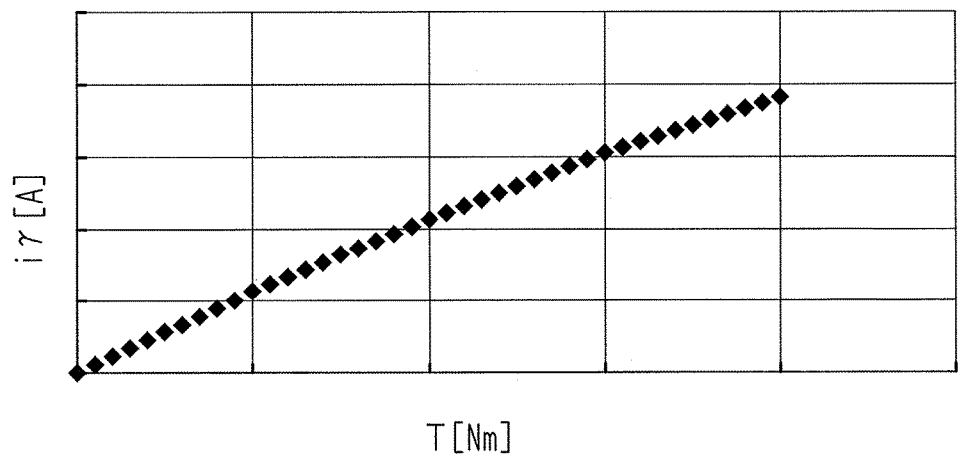
F I G. 8
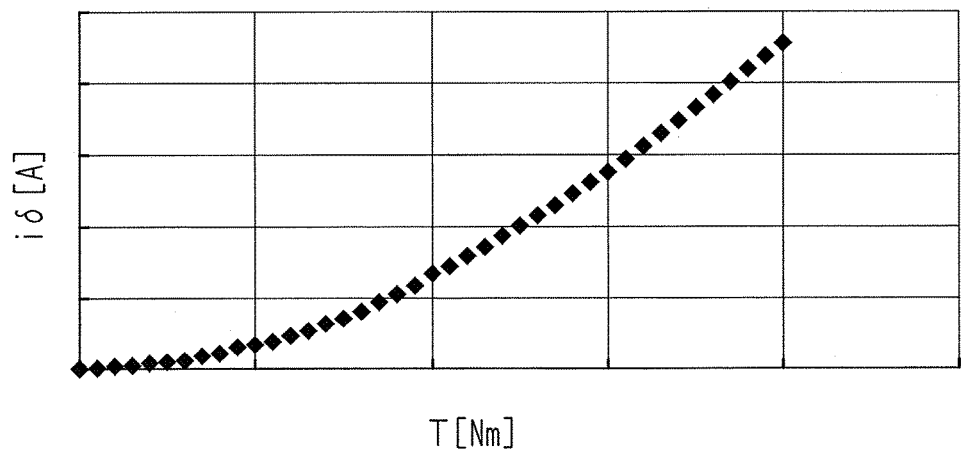

F I G. 9
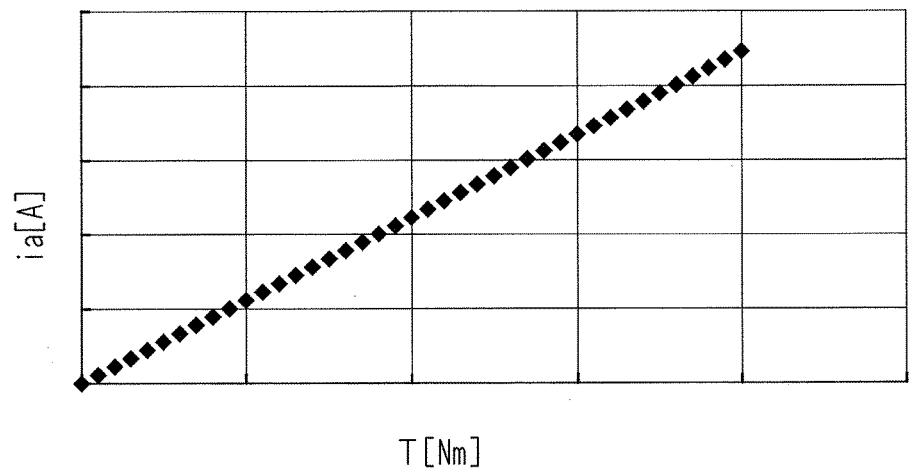
F I G. 10
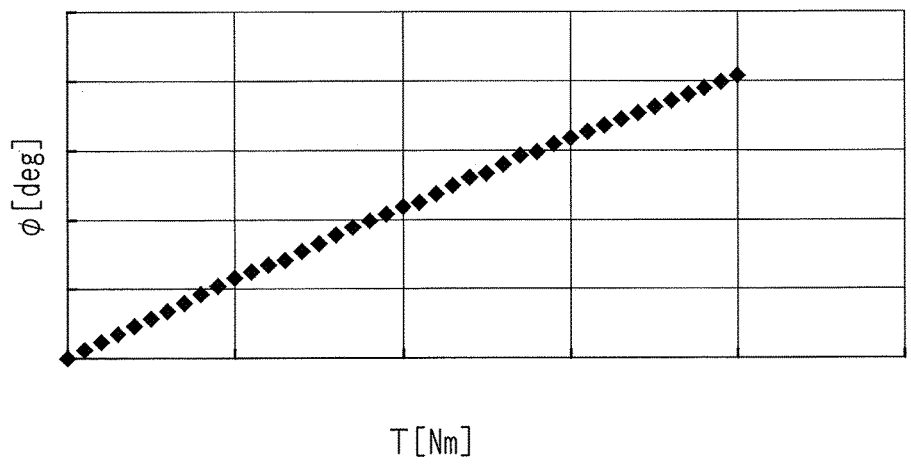

F I G. 1 6
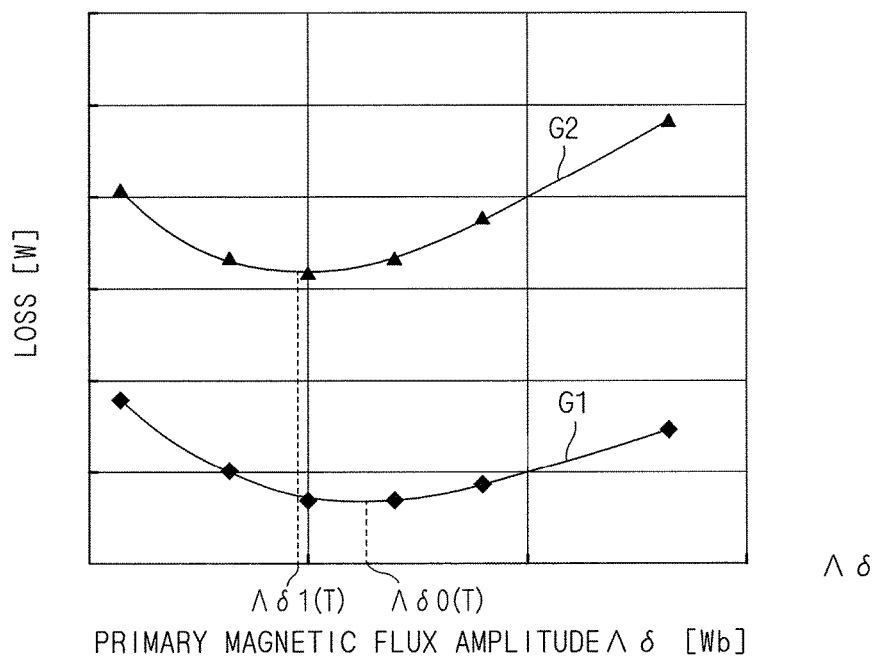
F I G. 1 7
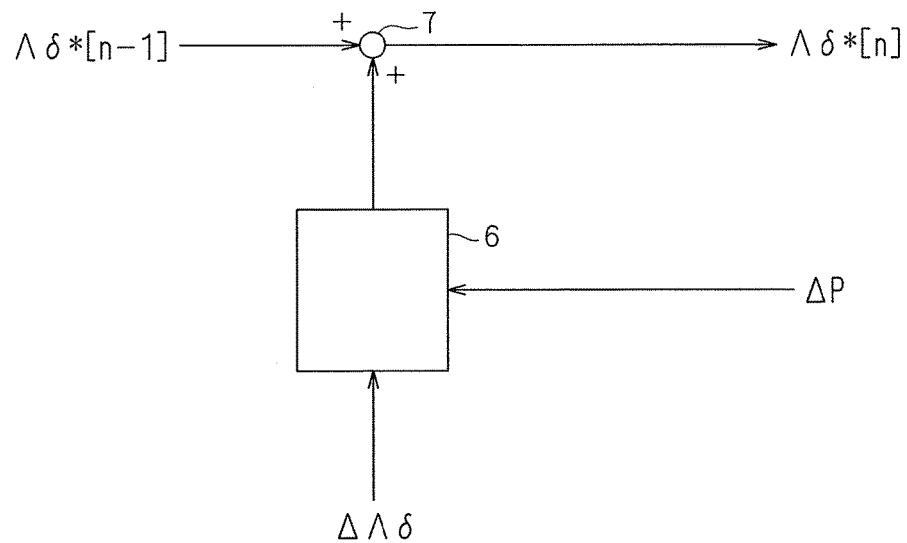

PRIMARY MAGNETIC FLUX CONTROL METHOD

TECHNICAL FIELD

The present disclosure relates to a technique for controlling a synchronous motor including a field and an armature.

More particularly, the present disclosure relates to a technique for controlling a rotary electric motor based on a so-called primary magnetic flux, which is a synthesis of a field flux that the field generates and a magnetic flux of an armature reaction generated by an armature current flowing in an armature winding.

BACKGROUND ART

Conventionally, various controls of a rotary electric motor based on a primary magnetic flux, i.e., so-called primary magnetic flux controls have been proposed. Briefly speaking, the primary magnetic flux control is a technique for stably controlling the rotary electric motor by controlling the primary magnetic flux of the rotary electric motor in accordance with a command value thereof.

It is assumed, for example, that a phase of a field flux $\Lambda 0$ is employed at a d axis in a rotating coordinate system, a phase of a primary magnetic flux $[\lambda 1]$ (this is treated as a vector having a direction and amplitude) is employed at a $\delta$ axis in another rotating coordinate system, and a phase difference of the $\delta$ axis with respect to the d axis is a load angle $\phi$. It is noted that, herein, a $\gamma$ axis is employed at a 90-degree leading phase with respect to the $\delta$ axis. Further, a $\delta c$ axis and a $\gamma c$ axis are defined as control axes in the rotating coordinate system which is employed in the control of the primary magnetic flux $[\lambda 1]$. The $\delta c$ axis and the $\gamma c$ axis correspond to the $\delta$ axis and the $\gamma$ axis, respectively, and a phase difference of the $\delta c$ axis with respect to the d axis is assumed as $\phi c$.

In this case, a command value of the primary magnetic flux $[\lambda 1]$ (hereinafter, referred to as a "primary magnetic flux command value") $[\Lambda 1^*]$ (this is treated as a vector having a direction and amplitude) has a positive value $\Lambda \delta^*$ as a $\delta c$-axis component, and a $\gamma c$-axis component is zero. Therefore, when the primary magnetic flux $[\lambda 1]$ is coincident with the primary magnetic flux command value $[\Lambda 1^*]$, the $\delta c$-axis component $\lambda 1 \delta c$ of the primary magnetic flux $[\lambda 1]$ is equal to the positive value $\Lambda \delta^*$ (this is also the amplitude of the primary magnetic flux command value $[\Lambda 1^*]$), and the phase difference $\phi c$ is equal to the load angle $\phi$, and the $\delta c$ axis is coincident with the $\delta$ axis.

In the primary magnetic flux control, control, for example, of a voltage command value to be corrected is performed so that not only the $\delta c$-axis component $\lambda 1 \delta c$ of the primary magnetic flux $[\lambda 1]$ should be made equal to the amplitude $\Lambda \delta^*$ of the primary magnetic flux command value $[\Lambda 1]$ but also a $\gamma c$-axis component $\lambda 1 \gamma c$ thereof should be zero. The phase difference $\phi c$ is thereby coincident with the load angle $\phi$.

In this manner, in the primary magnetic flux control, the amplitude $\Lambda \delta$ of the primary magnetic flux $[\lambda 1]$ is made equal to the amplitude $\Lambda \delta^*$ of the command value $[\Lambda 1^*]$, and the phase difference $\phi c$ is made coincident with the load angle $\phi$, whereby a torque T of the rotary electric motor can be controlled in proportion to the $\gamma c$-axis component $i \gamma c$ of the amplitude ia of the armature current independently of a rotation angle velocity. Normally, the control is performed on the assumption that the amplitude $\Lambda \delta^*$ is constant.

Specifically, a number of pole pairs n, the current amplitude ia, a phase (a so-called current phase) $\beta$ with respect to a q axis (this is a 90-degree leading phase with respect to the d axis) of the armature current, and the amplitude $\Lambda \delta$ are introduced into the following expression (1) to find the torque T.

$$T = n \cdot \Lambda \delta \cdot i\gamma \qquad (1)$$
$$= n \cdot \Lambda \delta \cdot ia \cdot \cos(\phi - \beta)$$

Note that, among the following prior-art documents, in Yabe and Sakanobe, "A Sensor-less Drive of IPM Motor with Over-modulation PWM", The papers of Joint Technical Meeting on Rotating Machinery, IEE Japan, 2001 (159), pp. 7 to 12, the $\delta$ axis and the $\gamma$ axis are exchanged and employed, as compared with those in the following other prior art documents: Japanese Patent No. 3672761; Japanese Patent Application Laid-Open No. 4-91693 (1992); Hotta, Asano, and Tsunehiro, "Method of controlling Position Sensorless DC brushless motor", 1988 Tokai-Section Joint Conference of the Institutes of Electrical and Related Engineers, p. 161; Kaku and Tsunehiro, "A Novel Technique for a DC Brushless Motor Having No Position-Sensors", 1990 Tokai-Section Joint Conference of the Institutes of Electrical and Engineers, p. 172; Kaku, Yamamura, and Tsunehiro, "A Novel Technique for a DC Brushless Motor Having No Position-Sensors", IEEJ Transaction on Industry Applications, 1991, Volume 111, No. 8, pp. 639 to 644; Urita, Tsukamoto, and Tsunehiro, "Constant estimation method for synchronous machines with the primary magnetic flux controlled", 1998 Tokai-Section Joint Conference of the Institutes of Electrical Engineers, p. 101; Urita, Yamamura, and Tsunehiro, "On General Purpose Inverter for Synchronous Motor Drive", IEEJ Transaction on Industry Applications, 1999, Volume 119, No. 5, pp. 707 to 712; and Takeda, Matsui, Morimoto, and Honda, "Design and Control of Interior Permanent Magnet Synchronous Motor", Ohmsha, 2001, pp. 23 to 26.

SUMMARY

Problems to be Solved by the Disclosure

In the control of the rotary electric motor, so-called maximum torque/current control in which a ratio T/ia is maximized has been conventionally demanded. By the current vector control, the current phase $\beta$ that minimizes the amplitude is when the torque is constant is found (e.g., refer to Takeda, Matsui, Morimoto, and Honda, "Design and Control of Interior Permanent Magnet Synchronous Motor", Ohmsha, 2001, pp. 23 to 26).

On the other hand, in order to set the proper current phase $\beta$ in the primary magnetic flux control, an approach different from the current vector control is required. This is because the current phase cannot be directly controlled as in the current vector control. However, such an approach has not been known, yet.

Since in the primary magnetic flux control, normally, the control is performed with the amplitude of the primary magnetic flux constant, the control in an efficient current phase is not performed when the torque fluctuates in some cases.

The present disclosure has been achieved in light of the above-described points, and an object thereof is to provide a technique for properly controlling a current phase by changing a primary magnetic flux command value in accordance with a torque in primary magnetic field control, and driving a rotary electric motor at an efficient operating point in accordance with the torque.

Means for Solving the Problems

A primary magnetic flux control method according to the present disclosure is a method including: setting a primary magnetic flux command value ($[\Lambda 1^*]$), which is a command value of a primary magnetic flux ($[\lambda 1]$), on a rotary electric motor including an armature having an armature winding, and a rotor which is a field rotating relatively to the armature; and controlling the primary magnetic flux in accordance with the primary magnetic flux command value.

The primary magnetic flux is a synthesis of a field flux ($\Lambda 0$) that the field generates and a magnetic flux ($[\lambda a]$: id·Ld, iq·Lq) of an armature reaction generated by an armature current (ia) flowing in the armature.

In a first aspect, the primary magnetic flux command value is changed in accordance with a torque (T) of the rotary electric motor to control a current phase ($\beta$) of the armature current with respect to a q axis that advances by $\pi/2$ with respect to a d axis in phase with the field flux ($\Lambda 0$) to be a desired phase in accordance with the torque.

According to a second aspect of the primary magnetic flux control method of the present disclosure, in the first aspect, based on relationships among the primary magnetic flux ($[\lambda 1]$), the armature current (ia), and the torque (T) of the rotary electric motor, the amplitude ($\Lambda\delta 0(T)$) of the primary magnetic flux that minimizes the armature current is set as the amplitude ($\Lambda\delta^*$) of the primary magnetic flux command value ($[\Lambda 1^*]$) in accordance with the torque.

According to a third aspect of the primary magnetic flux control method of the present disclosure, in the second aspect, the relationships are decided by $T=n\cdot\Lambda\delta\cdot ia\cdot\cos(\phi-\beta)$, $\Lambda\delta\cdot\sin\phi=Lq\cdot iq$, $\Lambda\delta\cdot\cos\phi=Ld\cdot id+\Lambda 0$, $\tan\beta=-id/iq$, $ia=\sqrt{(id^2+iq^2)}$, where a load angle $\phi$ with respect to the d axis of the primary magnetic flux ($[\lambda 1]$), the current phase $\beta$ with respect to the q axis of the armature current (ia), the amplitude $\Lambda 0$ of the field flux, the amplitude $\Lambda\delta$ of the primary magnetic flux, a d-axis inductance Ld and a q-axis inductance Lq of the rotary electric motor, a d-axis component id and a q-axis component iq of the armature current, a number of pole pairs n of the rotary electric motor, and the torque T are introduced.

According to a fourth aspect of the primary magnetic flux control method of the present disclosure, in the second aspect or in the third aspect, based on a relationship between the armature current taking a minimum value with respect to the primary magnetic flux, and the torque, the primary magnetic flux command value is set from the armature current.

According to a fifth aspect of the primary magnetic flux control method of the present disclosure, in the second aspect or in the third aspect, based on a relationship between an in-phase component (i$\delta$) and the torque, the in-phase component being in phase with the primary magnetic flux in the armature current taking the minimum value with respect to the primary magnetic flux, the primary magnetic flux command value is set from the in-phase component of the armature current.

According to a sixth aspect of the primary magnetic flux control method of the present disclosure, in the second aspect or in the third aspect, based on a relationship between an orthogonal component (i$\gamma$) and the torque, the orthogonal component being perpendicular to the primary magnetic flux in the armature current taking the minimum value with respect to the primary magnetic flux, the primary magnetic flux command value is set from the orthogonal component of the armature current.

According to a seventh aspect of the primary magnetic flux control method of the present disclosure, in the third aspect, based on a relationship between the load angle ($\phi$) and the torque, the load angle being decided by the magnetic flux of the armature reaction generated by the armature current taking the minimum value with respect to the primary magnetic flux, and the field flux, the primary magnetic flux command value is set from the load angle.

According to an eighth aspect of the primary magnetic flux control method of the present disclosure, in the first aspect, based on relationships among the primary magnetic flux ($[\lambda 1]$), the loss of the rotary electric motor, and the torque (T) and a rotation velocity of the rotary electric motor, the primary magnetic flux that minimizes the loss is set as the primary magnetic flux command value in accordance with the torque and the rotation velocity.

According to a ninth aspect of the primary magnetic flux control method of the present disclosure, in any one of the first to eighth aspects, a period when the primary magnetic flux command value is updated is different from a period of control of the primary magnetic flux based on the primary magnetic flux command value.

According to a tenth aspect of the primary magnetic flux control method of the present disclosure, in any one of the first to eighth aspects, the primary magnetic flux command value is not changed in a transition period of the control of the primary magnetic flux based on the primary magnetic flux command value, but is updated in a state where the control is stable.

According to an eleventh aspect of the primary magnetic flux control method of the present disclosure, in the fourth aspect, the primary magnetic flux command value is changed in accordance with the torque (T) of the rotary electric motor processed by a low-pass filter.

According to a twelfth aspect of the primary magnetic flux control method of the present disclosure, in the fifth aspect, the primary magnetic flux command value is changed in accordance with the in-phase component (i$\delta$) processed by a low-pass filter.

According to a thirteenth aspect of the primary magnetic flux control method of the present disclosure, in the sixth aspect, the primary magnetic flux command value is changed in accordance with the orthogonal component (i$\gamma$) processed by a low-pass filter.

According to a fourteenth aspect of the primary magnetic flux control method of the present disclosure, in the seventh aspect, the primary magnetic flux command value is changed in accordance with the load angle ($\phi$) processed by a low-pass filter.

In the first to fourteenth aspects of the primary magnetic flux control method of the present disclosure, for example, the primary magnetic flux command value is changed in accordance with an estimated value of the torque.

Effects

According to the first aspect of the primary magnetic flux control method of the present disclosure, changing the primary magnetic flux command value in accordance with the torque enables the current phase to be properly controlled, and the rotary electric motor to be driven at an efficient operating point in accordance with the torque.

According to the second to seventh aspects of the primary magnetic flux control method of the present disclosure, since the armature current has the minimum value with respect to the primary magnetic flux under a condition of the constant torque, employed as the primary magnetic flux command value corresponding to the minimum value, the maximum torque/current control can be implemented.

According to the eighth aspect of the primary magnetic flux control method of the present disclosure, since the loss has a minimum value with respect to the primary magnetic flux under a condition of the constant torque and the constant rotation velocity, employed as the primary magnetic flux command value corresponding to the minimum value, maximum efficiency control is implemented.

According to the ninth aspect of the primary magnetic flux control method of the present disclosure, interference between the setting of the primary magnetic flux command value and the control of the primary magnetic flux is suppressed.

According to the tenth aspect of the primary magnetic flux control method of the present disclosure, even when the primary magnetic flux command value changes, stability of the primary magnetic flux control is hard to impair.

According to the eleventh to fourteenth aspects of the primary magnetic flux control method of the present disclosure, influence on the primary magnetic flux control itself by setting the amplitude of the primary magnetic flux command value can be reduced.

The object, features, aspects, and advantages of the present disclosure will become more apparent from the following detailed description and the accompanying drawings.

BRIEF DESCRIPTION OF DRAWINGS

FIG. 3 is a graph showing relationships between amplitude of a primary magnetic flux, and amplitude of an armature current and a load angle;

FIG. 4 is a graph showing relationships between the amplitude of the primary magnetic flux, and the amplitude of the armature current and a current phase;

FIG. 7 is a graph showing a relationship between a torque and a γ-axis component of the amplitude of the armature current at an operating point where maximum torque/current is implemented;

FIG. 8 is a graph showing a relationship between the torque and a δ-axis component of the amplitude of the armature current at the operating point where the maximum torque/current is implemented;

FIG. 9 is a graph showing a relationship between the torque and the amplitude of the armature current at the operating point where the maximum torque/current is implemented;

FIG. 10 is a graph showing a relationship between the torque and the load angle at the operating point where the maximum torque/current is implemented;

FIG. 16 is a graph showing loss with respect to the amplitude of the primary magnetic flux; and FIG. 17 is a block diagram showing a configuration for obtaining the amplitude of the primary magnetic flux command value.

DESCRIPTION OF EMBODIMENTS

In the following embodiments, a rotary electric motor includes an armature having an armature winding, and a rotor which is a field rotating relatively to the armature. The rotary electric motor is provided with a permanent magnet or a field winding that generates a field flux.

First Embodiment

Figure 1:
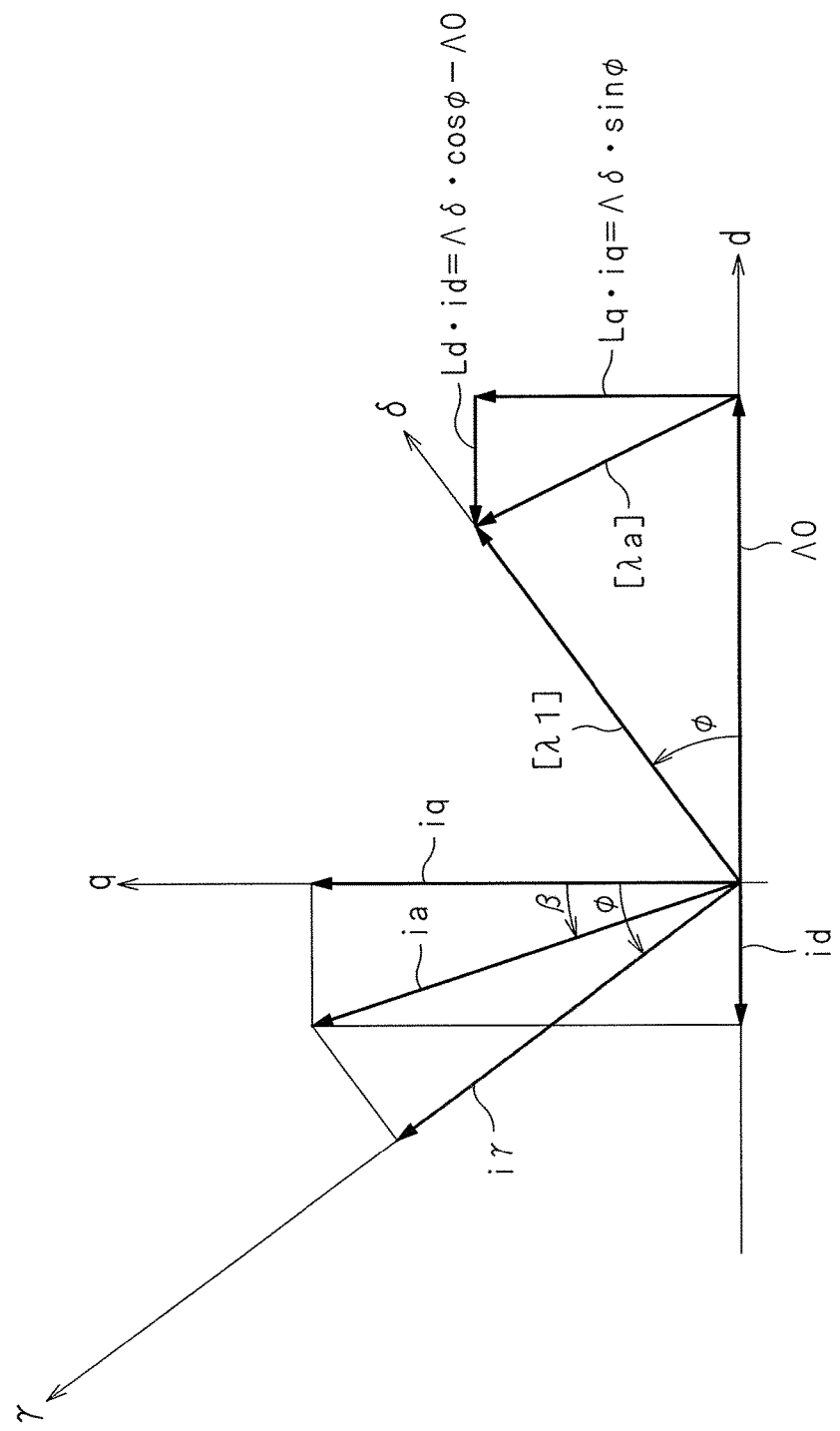
FIGS. 1 and 2 are vector diagrams for describing primary magnetic flux control.
Figure 2:
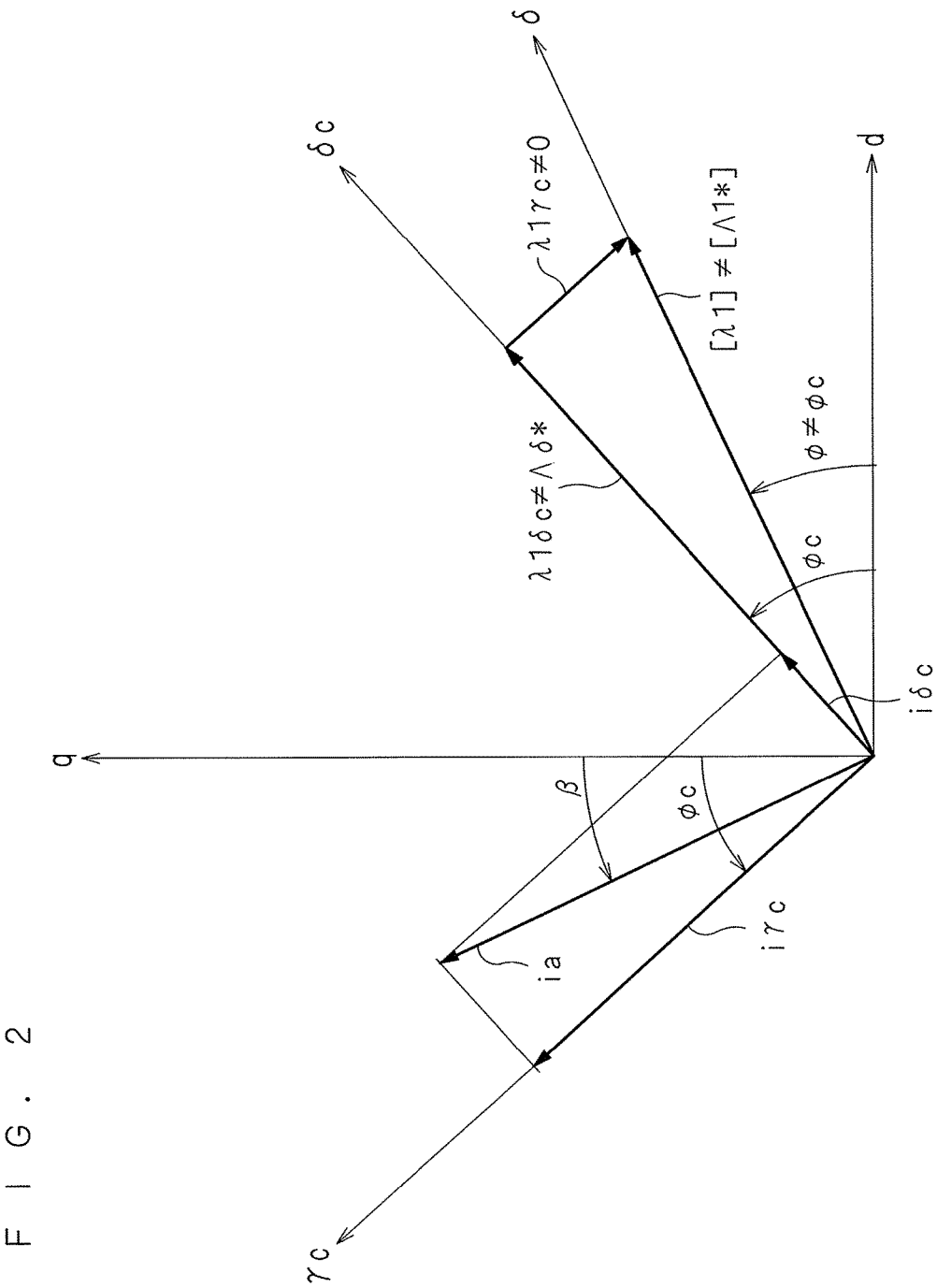

FIGS. 1 and 2 are vector diagrams each for describing primary magnetic field control.

In the primary magnetic flux control, set is a δc-γc coordinate system which is a leading phase with respect to a d-q coordinate system (a d axis is in phase with a field flux Λ0, and a q axis is in 90-degree leading phase with respect to the d axis) which employs a phase of the field flux Λ0 (i.e. with the rotation of a rotor) as a reference, by a phase difference $\phi c$. Then, a voltage to be applied to the rotary electric motor is adjusted so that a δc axis should be coincident with a δ axis, which is in phase with the primary magnetic flux.

First, FIG. 1 shows a case where the phase difference $\phi c$ is coincident with a load angle $\phi$. As shown in FIG. 1, a magnetic flux [λa] (this is treated as a vector having a direction and amplitude) of an armature reaction is a synthesis of a magnetic flux Lq·iq in a q-axis positive direction and a magnetic flux Ld·id in a d-axis negative direction.

Then, a primary magnetic flux [λ1] is a synthesis of the magnetic flux [λa] and the field flux Λ0 and takes a positive value Λδ (this is coincident with the amplitude Λδ* of a primary magnetic flux command value) in the δ axis.

Note that, if the primary magnetic flux [λ1] is not coincident with a primary magnetic flux command value [λ1*], a deviation arises between the phase difference $\phi c$ and the load angle $\phi$ in some cases, as shown in FIG. 2.

In the δc-γc rotating coordinate system on which the primary magnetic flux control is performed, control is performed so that a δc-axis component λ1δc of the primary magnetic flux [λ1] should be coincident with a δc-axis component Λδ* of the primary magnetic flux command value [Λ1*] and a γc-axis component λ1γc of the primary magnetic flux [λ1] should be coincident with a γc-axis component Λγ* (=0) of the primary magnetic flux command value [Λ1*].

With an armature current, a phase thereof leads with respect to the q axis by a current phase β, and the amplitude thereof ia can be decomposed into a q-axis component iq and a d-axis component id. Similarly, the amplitude ia can be decomposed into a γc-axis component iγc and a δc-axis component iδc. In FIG. 1, a case where a γc axis is coincident with a γ axis is shown, and thus, a γ-axis component iγ corresponding to the γc-axis component iγc is shown. Herein, in order to avoid complication of the figures, a component corresponding to the δc-axis component iδc is omitted in FIG. 1, and the q-axis component iq and the d-axis component id are omitted in FIG. 2.

FIG. 3 is a graph showing relationships between the positive value Λδ, which is the amplitude of the primary magnetic flux [λ1], and the amplitude ia of the armature current and the load angle φ when the torque T is kept at a certain constant value. It can be understood that the amplitude ia has a local minimum value with respect to the positive value Λδ. The primary magnetic field control is performed, using the above-described positive value Λδ that gives the above-described local minimum value of the amplitude ia (this is indicated as a value Λδ0(T)), whereby maximum torque/current control can be implemented.

In the primary magnetic field control, since as described above, not only a δc-axis component λ1δc of the primary magnetic flux [λ1] is made coincident with the positive value Λδ*, but also the γc-axis component λ1γc of the primary magnetic flux [λ1] is made coincident with the γ-axis component 0 of the primary magnetic flux command value [λ1*], setting only the positive value Λδ* to the value Λδ0(T) allows both the amplitude Λδ and the load angle φ in the primary magnetic flux [λ1] to be uniquely decided.

Deciding the primary magnetic flux [λ1] results in uniquely deciding the magnetic flux [λa] because the field flux Λ0 is constant (see FIG. 1). The magnetic fluxes Lq·iq, Ld·id forming the magnetic flux [λa] are proportional to the q-axis component iq and the d-axis component id of the armature current, respectively, and proportionality constants Lq, Ld are decided, based on inductances of the rotary electric motor. Consequently, only deciding the positive value Λδ* taking the value Λδ0(T) with respect to a certain torque T allows the current phase β to be properly controlled without need for performing anew a calculation such as the current vector control. FIG. 4 is a graph showing relationships between the positive value Λδ, and the amplitude ia and the current phase β when the torque T is kept at a certain constant value.

Obviously, the value Λδ0(T) takes various values, depending on the torque T. Thus, for the various torques T, the relationship between the amplitude Λ0 of the primary magnetic flux and the amplitude ia of the armature current is found in advance, whereby the value Λδ0(T) obtained in accordance with the torque can be employed as the amplitude Λδ* of the primary magnetic flux command value. This enables the maximum torque/current control to be implemented in the primary magnetic flux control.

In other words, the primary magnetic flux command value [λ1*] is changed in accordance with the torque T to perform the primary magnetic flux control, whereby the current phase β can be controlled so as to be the desired phase in accordance with the torque T.

If as in the background art, the primary magnetic flux control with the amplitude Λδ* of the primary magnetic flux command value [λ1*] constant is performed, the rotary electric motor is driven at an inefficient operating point with respect to the torque T in some cases. In contrast, in the above-described technique, changing the amplitude Λδ* in accordance with the torque T enables the current phase β to be properly controlled, and the rotary electric motor to be driven at an efficient operating point in accordance with the torque T.

Particularly, employing the value Λδ0(T) as the amplitude Λδ* enables the maximum torque/current control to be implemented. Note that, the primary magnetic flux control after the amplitude Λδ* is obtained has been briefly described above, and is well-known, and thus, herein, descriptions of detailed operation and configurations required for the operation are omitted.

Figure 5:
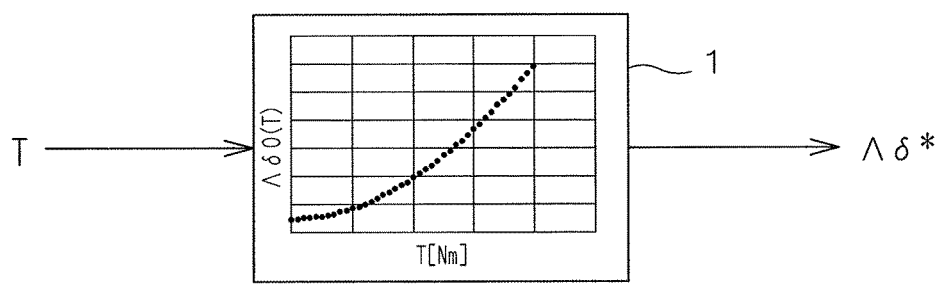
FIGS. 5 and 6 are block diagrams showing a configuration for obtaining the amplitude of the primary magnetic flux command value.

FIG. 5 is a block diagram showing a configuration to obtain the above-described amplitude Λδ*. A primary magnetic flux command value setting unit 1 stores relationships among the amplitude Λδ of the primary magnetic flux [λ1], the amplitude ia of the armature current, and the torque T of the rotary electric motor. The value Λδ0(T) that minimizes the amplitude ia is outputted as the amplitude Λδ* of the primary magnetic flux command value [λ1*] in accordance with the torque T.

In FIG. 5, an image is drawn in which the relationships between the amplitude ia and the value Λδ0(T) shown in FIGS. 3 and 4 are stored with respect to the various torques T in the primary magnetic flux command value setting unit 1.

Alternatively, the primary magnetic flux command value setting unit 1 performs calculation, based on the above-described relationships to output the amplitude Λδ*. It is well known that there is a relationship of the following expression (2) among the amplitude Λδ of the primary magnetic flux, and the proportionality constants Lq, Ld, the load angle φ, the amplitude ia of the armature current and the q-axis component iq and the d-axis component id, and the current phase β. However, there is a relationship of iγ=iq·cos φ−id·sin φ.

$$\left. \begin{array}{l} \Lambda\delta \cdot \sin\phi = Lq \cdot iq \\ \Lambda\delta \cdot \cos\phi - \Lambda 0 + Ld \cdot id \\ \tan\beta = -id/iq \\ ia = \sqrt{id^2 + iq^2} \end{array} \right\} \quad (2)$$

Thus, by calculating the expressions (1) and (2), the value Λδ0(T) of the primary amplitude Λδ that minimizes the amplitude is for each torque T can be found.

Note that, for the torque T, a detected value can be used. Alternatively, an estimated value T^ can be employed. The estimated value T^ is found by the following expression (3) with reference to FIG. 2.

$$T^{\wedge}=n(\lambda1\delta c \cdot i\gamma c - \lambda1\gamma c \cdot i\delta c) \quad (3)$$

Alternatively, it is considered that when the rotary electric motor is in a steady state, the primary magnetic flux [λ1] and the command value thereof [λ1*] are coincident. Thus, referring to FIGS. 1 and 2, the estimated value T^ may be found by the following expression (4).

$$T^{\wedge}=n \cdot \Lambda\delta^* \cdot i\gamma c \quad (4)$$

Figure 6:
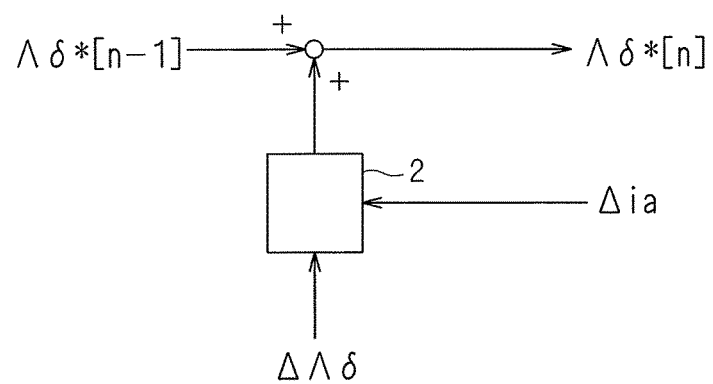

Alternatively, the value Λδ0(T) that the amplitude Λδ* should take can be obtained while actually operating the primary magnetic flux control at the desired torque T. FIG. 6 is a block diagram showing a technique for finding, from the amplitude Λδ*[n−1] of the primary magnetic flux command value [λ1*] at certain control timing, the amplitude Λδ*[n] of the primary magnetic flux command value [λ1*] at next control timing. Herein, the amplitude Λδ* that minimizes the amplitude ia is found, and the same method as a so-called "hill-climbing method" in which a parameter is changed to find a local minimum value of a control target value is used.

A case is assumed where an increase by a change amount ΔΛδ from the amplitude Λδ*[n−2] of the primary magnetic flux command value [λ1*] at certain control timing to the amplitude Λδ*[n−1] at next control timing results in an increase of the amplitude ia by a difference Δia. In this case, a change leaving from the value Λδ0(T) that minimizes the amplitude ia, is made from the amplitude Λδ*[n−2] to the amplitude Λδ*[n−1]. It is thus considered that the amplitude Λδ*[n] is reduced with respect to the amplitude Λδ*[n−1] by the change amount ΔΛδ, whereby the amplitude Λδ*[n] approaches the value Λδ0(T).

On the contrary, a case is assumed where an increase by the change amount ΔΛδ from the amplitude Λδ*[n−2] to the amplitude Λδ*[n−1] results in a decrease of the amplitude ia by the difference Ma. In this case, a change approaching the value Λδ0(T) that minimizes the amplitude ia, is made from the amplitude Λδ*[n−2] to the amplitude Λδ*[n−1]. It is thus considered that the amplitude Λδ*[n] is increased with respect to the amplitude Λδ*[n−1] by the change amount ΔΛδ, whereby the amplitude Λδ*[n] approaches the value Λδ0(T).

Thus, operation is desirable in which an increment generator 2 has the change amount ΔΛδ and the difference Δia inputted to output ΔΛδ×g(Δia), and an adder adds ΔΛδ×g(Δia) to the amplitude Λδ*[n−1] to find the amplitude Λδ*[n]. However, a function g(Q) takes a value (−1) when a value Q is positive, and takes a value 1 when the value Q is negative.

FIGS. 7 to 9 are graphs each showing a relationship between the torque T and the armature current at an operating point where the maximum torque/current is implemented. FIG. 7 is a graph showing a relationship between the torque T and the γ-axis component iγ of the amplitude ia, FIG. 8 is a graph showing a relationship between the torque T and the δ-axis component iδ of the amplitude ia, and FIG. 9 is a graph showing a relationship between the torque T and the amplitude ia. FIG. 10 is a graph showing a relationship between the torque T and the load angle φ at the operating point where the maximum torque/current is implemented. These graphs show that the torque T is uniquely decided by the γ-axis component iγ, the δ-axis component iδ, the amplitude ia, and the load angle φ with respect to the operating point where the maximum torque/current is implemented.

For example, the graphs shown in FIGS. 7 to 10 may be found from the expressions (1) and (2), or may be experimentally found.

Obviously, By combining the γ-axis component iγ and the δ-axis component iδ to find a new index depending on the torque T, so that the value Λδ0(T) corresponding to the index may be employed as the amplitude Λδ*. However, the index needs to uniquely decide the torque T. In light of FIG. 2, the amplitude ia can be grasped as one relevant index.

In the steady state, φ=φc, iγ=iγc, and iδ=iδc are established. Thus, in place of the torque T, the value Λδ0(T) corresponding to each of the γc-axis component iγc, the δc-axis component iδc, the amplitude ia, and the phase difference φc is employed for the amplitude Λδ*, which enables the maximum torque/current to be implemented. In this case, a device that detects the torque T is not required.

Figure 11:
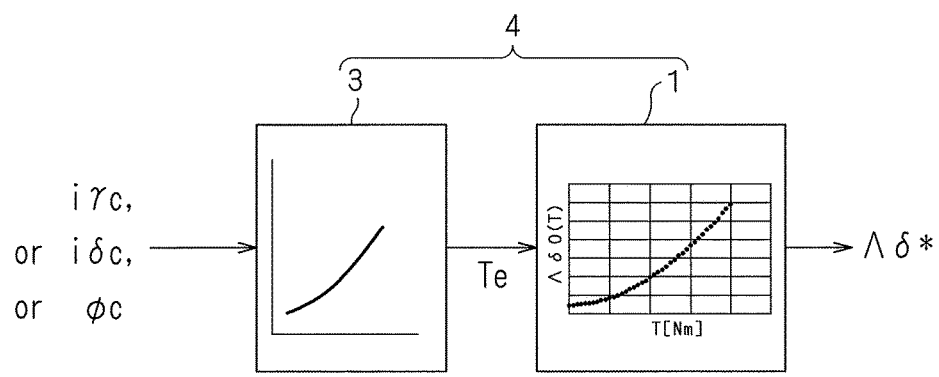
FIGS. 11 to 13 are block diagrams showing a configuration for obtaining the amplitude of the primary magnetic flux command value.

FIG. 11 is a block diagram showing a technique for outputting the value Λδ0(T) corresponding to each of the γc-axis component iγc, the δc-axis component iδc, the amplitude ia, and the phase difference φc as the amplitude Λδ*.

A primary magnetic flux command value setting unit 4 has a torque estimating unit 3 and a primary magnetic flux command value setting unit 1. The torque estimating unit 3 sets a torque estimated value Te, based on γc-axis component iγc, the δc-axis component iδc (or further, the amplitude ia) or the phase difference φc. The torque estimated value Te is not the estimated value T^ obtained by the expressions (3) and (4), but an estimated value of the torque T estimated from the expressions (1) and (2), or FIGS. 7 to 10.

In this manner, the maximum torque/current can be implemented without detecting the torque T.

Figure 12:
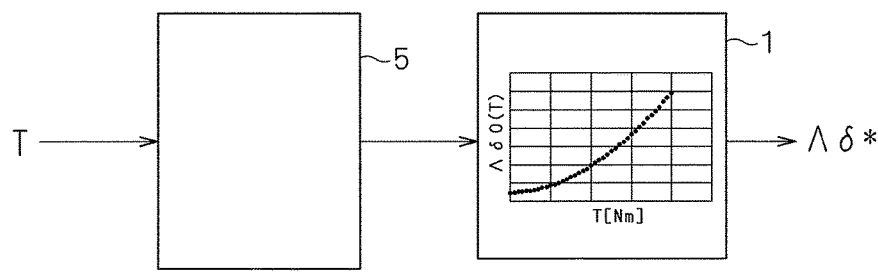
Figure 13:
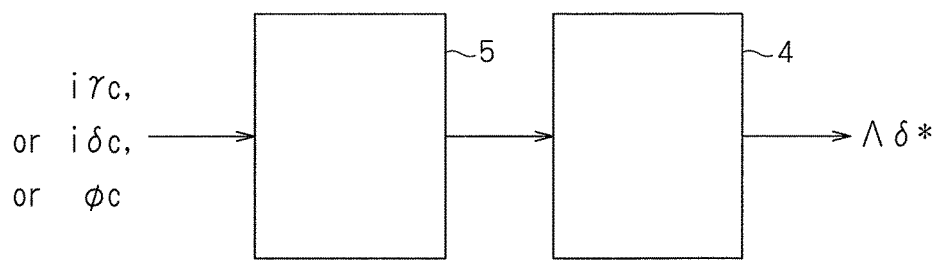

FIG. 12 illustrates a configuration in which a filter 5 is provided at a previous stage of the primary magnetic flux command value setting unit 1. Moreover, FIG. 13 illustrates a configuration in which the filter 5 is provided at a previous stage of the primary magnetic flux command value setting unit 4. The filter 5 functions as a low-pass filter. Based on the torque T obtained by processing through the low-pass filter, setting the primary magnetic flux command value suppresses rapid change of the primary magnetic flux command value. This can reduce influence on the primary magnetic flux control itself by setting the amplitude Λδ* in each torque T (or each estimated value Te thereof), or in each δc-axis component iδc and γc-axis component iγc or in each phase difference φc.

Figure 14:
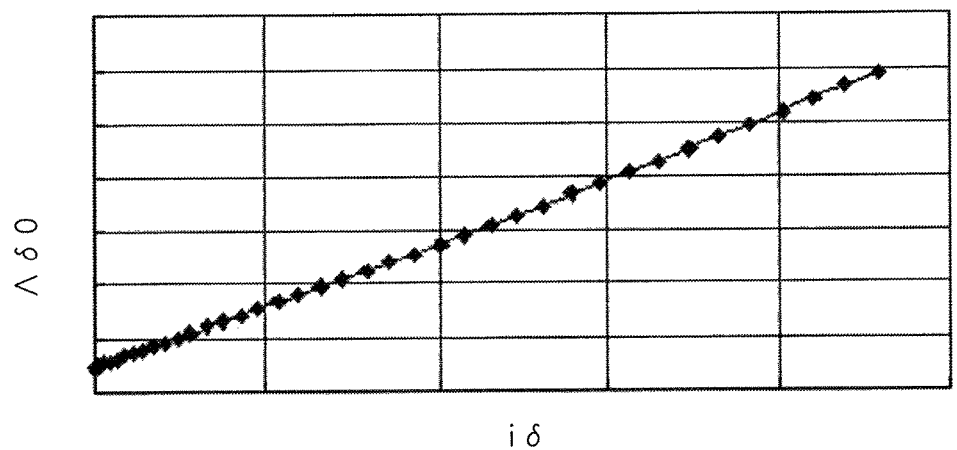
FIG. 14 is a graph showing a relationship between a δ-axis component iδ and the primary magnetic flux amplitude at the operating point where the maximum torque/current is implemented.
Figure 15:
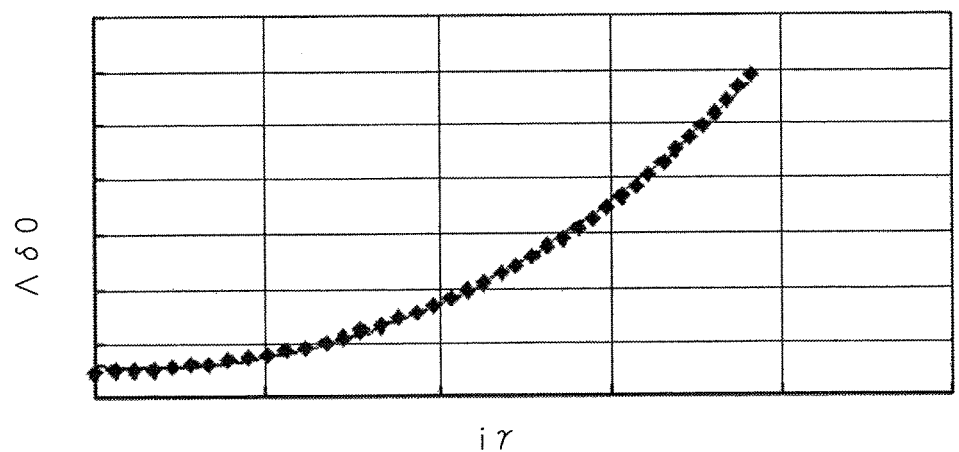
FIG. 15 is a graph showing a relationship between a γ-axis component iγ and the primary magnetic flux amplitude at the operating point where the maximum torque/current is implemented.

The primary magnetic flux command value setting unit 4 shown in FIG. 11 is not necessarily required to have the torque estimating unit 3 and the primary magnetic flux command value setting unit 1. It is rather desirable to experimentally obtain a relationship between the δ-axis component iδ and the value Λδ0 (see FIG. 14) and a relationship between the γ-axis component iγ and the value Λδ0 (see FIG. 15) and to hold the same by formularization or as a table (or a map). This is because the torque estimated value Te need not be found once.

Second Embodiment

The value Λδ0(T) may be the primary magnetic flux [λ1] that provides minimum electric power/torque in place of the amplitude of the primary magnetic flux [λ1] that provides the maximum torque/current. In this case as well, as long as the amplitude Λδ* taking the value Λδ0(T) is decided and the primary magnetic flux control is performed, the current phase β to obtain maximum efficiency is properly controlled without need for performing anew a calculation such as the current vector control.

That is, based on relationships among the primary magnetic flux [λ1], loss of the rotary electric motor, and the torque T and a rotation velocity of the rotary electric motor, the primary magnetic flux that minimizes the loss is set as the primary magnetic flux command value in accordance with the torque T and the rotation velocity to perform the primary magnetic flux control, which can implement maximum efficiency control.

FIG. 16 is a graph showing the loss with respect to the amplitude Λδ of the primary magnetic flux [λ1] when the torque T and the rotation velocity of the rotary electric motor are constant. Curves G1, G2 indicate copper loss, and a sum of the copper loss and iron loss of the rotary electric motor, respectively. Since the copper loss is proportional to the square of the current flowing the rotary electric motor, the primary magnetic flux that provides a minimum value of the curve G1 can be employed as the value Λδ0(T) in the first embodiment.

In the present embodiment, the amplitude of the primary magnetic flux [λ1] that provides a minimum value of the curve G2 is found as a value Λδ1(T), and this is employed as the amplitude Λδ* of the primary magnetic flux command value [Λ1*].

The above-described value Λδ1(T) can be found by a method analogous to the so-called "hill-climbing method", as in the description with reference to FIG. 6.

Specifically, referring to FIG. 17, from the amplitude Λδ*[n−1] at certain control timing, the amplitude Λδ*[n] at next control timing is found. Herein, the amplitude Λδ* that minimizes electric power is found.

A case is assumed where when an increase by the change amount ΔΛδ from the amplitude Λδ*[n−2] at certain control timing to the amplitude Λδ*[n−1] at next control timing results in an increase of the electric power by a difference ΔP.

An increment generator 6 has the change amount ΔΛδ and the difference ΔP inputted to output ΔΛδ×g(ΔP), and an adder 7 adds ΔΛδ×g(ΔP) to the amplitude Λδ*[n−1] to find the amplitude Λδ*[n]. A function g is as described above.

In the second embodiment as well, as in the first embodiment, a filter may be used to remove components in the vicinity of a control frequency of the primary magnetic flux control of the torque T (or the estimated value thereof Te) and to set the amplitude Λδ*.

Moreover, by experimentally finding, in advance, the value Λδ1(T) of the primary magnetic flux that minimizes the loss in accordance with the rotation velocity or the value of the primary magnetic flux that minimizes the loss in accordance with the rotation velocity and the torque T, a table (or a map) of these values may be created. In accordance with the rotation velocity and the torque T, by reading the value of the primary magnetic flux that minimizes the loss from the table, the read value may be set as the primary magnetic flux command value.

Moreover, the rotation velocity may be a value of an electrical angle or a value of a mechanical angle. Since in the steady state, velocities of the control axes (the δc axis and the γc axis) and a velocity command (of an electrical angle) are coincident with the rotation velocity, these may be substituted for the rotation velocity.

Alternatively, in the first embodiment and the second embodiment, in place of employing the filter, a period when the amplitude Λδ* is updated may be delayed with respect to a control period of the primary magnetic flux control. This can suppress interference between the setting of the primary magnetic flux command value [Λ1*] and the primary magnetic flux control.

Alternatively, the amplitude Λδ* is updated only when velocity pulsation falls in a predetermined range without updating at other timing, whereby the primary magnetic flux control can be stably executed.

In other words, in terms of difficulty of impairment of stability of the primary magnetic flux control even if the primary magnetic flux command value [Λ1*] changes, it is desirable that the primary magnetic flux command value [Λ1*] is not changed in a transition period of the primary magnetic flux control based on the primary magnetic flux command value [Λ1*], but is updated in a state where the primary magnetic flux control is stable.

While the present disclosure has been described in detail, the above description is illustrative, and does not limit the present disclosure in all aspects. It should be understood that a number of modifications that are not exemplified can be assumed without departing from the scope of the present disclosure.

The invention claimed is:

1. A primary magnetic flux control method comprising:
    setting a primary magnetic flux command value, which is a command value of a primary magnetic flux, on a rotary electric motor including an armature having an armature winding, and a rotor which is a field rotating relatively to said armature;
    controlling said primary magnetic flux in accordance with said primary magnetic flux command value, said primary magnetic flux being a synthesis of a field flux that said field generates and a magnetic flux of an armature reaction generated by an armature current flowing in said armature; and
    changing said primary magnetic flux command value in accordance with a detected or estimated torque of said rotary electric motor to control a current phase of said armature current with respect to a q axis that advances by π/2 with respect to a d axis in phase with said field flux to be a desired phase in accordance with said torque,
    wherein changing said primary magnetic flux command value includes setting as an amplitude of said primary magnetic flux command a value that minimizes said armature current in accordance with said torque based on a relationship between a load angle and said torque, said load angle being decided by said magnetic flux of said armature reaction generated by said armature current taking the minimum value with respect to said primary magnetic flux, and said field flux, said primary magnetic flux command value is set from said load angle, and
    wherein said relationships are decided by $$T = n \cdot \Lambda\delta \cdot ia \cdot \cos(\phi - \beta),$$

$$\Lambda\delta \cdot \sin \phi = Lq \cdot iq,$$

$$\Lambda\delta \cdot \cos \phi = Ld \cdot id + \Lambda 0,$$

$$\tan \beta = -id/iq,$$

$$ia = \sqrt{(id^2 + iq^2)},$$

where φ is a load angle with respect to said d axis of said primary magnetic flux, β is a current phase with respect to said q axis of said armature current, Λ0 is the amplitude of said field flux, Λδ is the amplitude of said primary magnetic flux, Ld is a d-axis induction of said rotary electric motor and Lq is q-axis inductance of said rotary electric motor, id is a d-axis component of said armature current and iq is a q-axis component of said armature current, n is a number of pole pairs of said rotary electric motor, and T is a torque.

2. The primary magnetic flux control method according to claim 1, wherein said load angle is processed by a low-pass filter.

3. A primary magnetic flux control method comprising:
    setting a primary magnetic flux command value, which is a command value of a primary magnetic flux, on a rotary electric motor including an armature having an armature winding, and a rotor which is a field rotating relatively to said armature;
    controlling said primary magnetic flux in accordance with said primary magnetic flux command value, said primary magnetic flux being a synthesis of a field flux that said field generates and a magnetic flux of an armature reaction generated by an armature current flowing in said armature; and
    changing said primary magnetic flux command value in accordance with a detected or estimated torque of said rotary electric motor to control a current phase of said armature current with respect to a q axis that advances by π/2 with respect to a d axis in phase with said field flux to be a desired phase in accordance with said torque,
    wherein changing said primary magnetic flux command value includes setting as an amplitude of said primary magnetic flux command a value corresponding to a primary magnetic flux that minimizes a loss of said rotary electric motor based on relationships among said primary magnetic flux, said loss of said rotary electric motor, and said torque and a rotation velocity of said rotary electric motor in accordance with said torque and said rotation velocity, and wherein said relationships are decided by $T = n \cdot \Lambda\delta \cdot ia \cdot \cos(\phi - \beta),$ $\Lambda\delta \cdot \sin \phi = Lq \cdot iq,$ $\Lambda\delta \cdot \cos \phi = Ld \cdot id + \Lambda 0,$ $\tan \beta = -id/iq,$ $ia = \sqrt{(id^2 + iq^2)},$ where $\phi$ is a load angle with respect to said d axis of said primary magnetic flux, $\beta$ is a current phase with respect to said q axis of said armature current, $\Lambda 0$ is the amplitude of said field flux, $\Lambda\delta$ is the amplitude of said primary magnetic flux, Ld is a d-axis induction of said rotary electric motor and Lq is q-axis inductance of said rotary electric motor, id is a d-axis component of said armature current and iq is a q-axis component of said armature current, n is a number of pole pairs of said rotary electric motor, and T is a torque.

4. A primary magnetic flux control method comprising:

setting a primary magnetic flux command value, which is a command value of a primary magnetic flux, on a rotary electric motor including an armature having an armature winding, and a rotor which is a field rotating relatively to said armature;

controlling said primary magnetic flux in accordance with said primary magnetic flux command value, said primary magnetic flux being a synthesis of a field flux that said field generates and a magnetic flux of an armature reaction generated by an armature current flowing in said armature; and changing said primary magnetic flux command value in accordance with a detected or estimated torque of said rotary electric motor to control a current phase of said armature current with respect to a q axis that advances by $\pi/2$ with respect to a d axis in phase with said field flux to be a desired phase in accordance with said torque, wherein a period when said primary magnetic flux command value is updated is different from a period of control of said primary magnetic flux based on said primary magnetic flux command value, and wherein said relationships are decided by $T = n \cdot \Lambda\delta \cdot ia \cdot \cos(\phi - \beta),$ $\Lambda\delta \cdot \sin \phi = Lq \cdot iq,$ $\Lambda\delta \cdot \cos \phi = Ld \cdot id + \Lambda 0,$ $\tan \beta = -id/iq,$ $ia = \sqrt{(id^2 + iq^2)},$ where $\phi$ is a load angle with respect to said d axis of said primary magnetic flux; $\beta$ is a current phase with respect to said q axis of said armature current, AO is the amplitude of said field flux; $\Lambda\delta$ is the amplitude of said primary magnetic flux, Ld is a d-axis induction of said rotary electric motor and Lq is q-axis inductance of said rotary electric motor, id is a d-axis component of said armature current and iq is a q-axis component of said armature current, n is a number of pole pairs of said rotary electric motor, and T is a torque.

5. A primary magnetic flux control method comprising:

setting a primary magnetic flux command value, which is a command value of a primary magnetic flux, on a rotary electric motor including an armature having an armature winding, and a rotor which is a field rotating relatively to said armature;

controlling said primary magnetic flux in accordance with said primary magnetic flux command value, said primary magnetic flux being a synthesis of a field flux that said field generates and a magnetic flux of an armature reaction generated by an armature current flowing in said armature; and changing said primary magnetic flux command value in accordance with a detected or estimated torque of said rotary electric motor to control a current phase of said armature current with respect to a q axis that advances by $\pi/2$ with respect to a d axis in phase with said field flux to be a desired phase in accordance with said torque, wherein said primary magnetic flux command value is not changed in a transition period of the control of said primary magnetic flux based on said primary magnetic flux command value, but is updated in a state where said control is stable, wherein said relationships are decided by $T = n \cdot \Lambda\delta \cdot ia \cdot \cos(\phi - \beta),$ $\Lambda\delta \cdot \sin \phi = Lq \cdot iq,$ $\Lambda\delta \cdot \cos \phi = Ld \cdot id + \Lambda 0,$ $\tan \beta = -id/iq,$ $ia = \sqrt{(id^2 + iq^2)},$ where $\phi$ is a load angle with respect to said d axis of said primary magnetic flux, $\beta$ is a current phase with respect to said q axis of said armature current, $\Lambda 0$ is the amplitude of said field flux, $\Lambda\delta$ is the amplitude of said primary magnetic flux, Ld is a d-axis induction of said rotary electric motor and Lq is q-axis inductance of said rotary electric motor, id is a d-axis component of said armature current and iq is a q-axis component of said armature current, n is a number of pole pairs of said rotary electric motor, and is a torque.

6. A primary magnetic flux control method comprising:

setting a primary magnetic flux command value, which is a command value of a primary magnetic flux, on a rotary electric motor including an armature having an armature winding, and a rotor which is a field rotating relatively to said armature;

controlling said primary magnetic flux in accordance with said primary magnetic flux command value, said primary magnetic flux being a synthesis of a field flux that said field generates and a magnetic flux of an armature reaction generated by an armature current flowing in said armature; and changing said primary magnetic flux command value in accordance with a detected or estimated torque of said rotary electric motor to control a current phase of said armature current with respect to a q axis that advances by $\pi/2$ with respect to a d axis in phase with said field flux to be a desired phase in accordance with said torque, wherein changing said primary magnetic flux command value includes setting as an amplitude of said primary magnetic flux command a value that minimizes said armature current in accordance with said torque of said rotary electric motor processed by a low-pass filter and between said armature current taking a minimum value with respect to said primary magnetic flux, and said torque, said primary magnetic flux command value is set from said armature current, wherein said relationships among said primary magnetic flux, said armature current, and said torque of said rotary electric motor are decided by $T = n \cdot \Lambda\delta \cdot ia \cdot \cos(\phi-\beta)$, $\Lambda\delta \cdot \sin \phi = Lq \cdot iq$, $\Lambda\delta \cdot \cos \phi = Ld \cdot id + \Lambda 0$, $\tan \beta = -id/iq$, $ia = \sqrt{(id^2 + iq^2)}$, where φ is a load angle with respect to said d axis of said primary magnetic flux, β is a current phase with respect to said q axis of said armature current, Λ0 is the amplitude of said field flux, Λδ is the amplitude of said primary magnetic flux, Ld is a d-axis induction of said rotary electric motor and Lq is q-axis inductance of said rotary electric motor, id is a d-axis component of said armature current and iq is a q-axis component of said armature current, n is a number of pole pairs of said rotary electric motor, and T is a torque.

7. A primary magnetic flux control method comprising:
setting a primary magnetic flux command value, which is a command value of a primary magnetic flux, on a rotary electric motor including an armature having an armature winding, and a rotor which is a field rotating relatively to said armature;
controlling said primary magnetic flux in accordance with said primary magnetic flux command value, said primary magnetic flux being a synthesis of a field flux that said field generates and a magnetic flux of an armature reaction generated by an armature current flowing in said armature; and
changing said primary magnetic flux command value in accordance with a detected or estimated torque of said rotary electric motor to control a current phase of said armature current with respect to a q axis that advances by π/2 with respect to a d axis in phase with said field flux to be a desired phase in accordance with said torque,
wherein changing said primary magnetic flux command value includes setting as an amplitude of said primary magnetic flux command a value from an in-phase component of said armature current in accordance with said torque of said rotary electric motor, said in-phase component being in phase with said primary magnetic flux in said armature current having a minimum value with respect to said primary magnetic flux,
wherein said in-phase component is processed by a low-pass filter, and
wherein said relationships are decided by $T = n \cdot \Lambda\delta \cdot ia \cdot \cos(\phi-\beta)$, $\Lambda\delta \cdot \sin \phi = Lq \cdot iq$, $\Lambda\delta \cdot \cos \phi = Ld \cdot id + \Lambda 0$, $\tan \beta = -id/iq$, $ia = \sqrt{(id^2 + iq^2)}$, where φ is a load angle with respect to said d axis of said primary magnetic flux, β is a current phase with respect to said q axis of said armature current, Λ0 is the amplitude of said field flux, Λδ is the amplitude of said primary magnetic flux, Ld is a d-axis induction of said rotary electric motor and Lq is q-axis inductance of said rotary electric motor, id is a d-axis component of said armature current and iq is a q-axis component of said armature current, n is a number of pole pairs of said rotary electric motor, and T is a torque.

8. A primary magnetic flux control method comprising:
setting a primary magnetic flux command value, which is a command value of a primary magnetic flux, on a rotary electric motor including an armature having an armature winding, and a rotor which is a field rotating relatively to said armature;
controlling said primary magnetic flux in accordance with said primary magnetic flux command value, said primary magnetic flux being a synthesis of a field flux that said field generates and a magnetic flux of an armature reaction generated by an armature current flowing in said armature; and
changing said primary magnetic flux command value in accordance with a detected or estimated torque of said rotary electric motor to control a current phase of said armature current with respect to a q axis that advances by π/2 with respect to a d axis in phase with said field flux to be a desired phase in accordance with said torque,
wherein changing said primary magnetic flux command value includes setting as an amplitude of said primary magnetic flux command a value set from an orthogonal component of said armature current and said torque, said orthogonal component being orthogonal to said primary magnetic flux in said armature current having a minimum value with respect to said primary magnetic flux,
wherein said orthogonal component is processed by a low-pass filter, and
wherein said relationships are decided by $T = n \cdot \Lambda\delta \cdot ia \cdot \cos(\phi-\beta)$, $\Lambda\delta \cdot \sin \phi = Lq \cdot iq$, $\Lambda\delta \cdot \cos \phi = Ld \cdot id + \Lambda 0$, $\tan \beta = -id/iq$, $ia = \sqrt{(id^2 + iq^2)}$, where φ is a load angle with respect to said d axis of said primary magnetic flux, β is a current phase with respect to said q axis of said armature current, Λ0 is the amplitude of said field flux, Λδ is the amplitude of said primary magnetic flux, Ld is a d-axis induction of said rotary electric motor and Lq is q-axis inductance of said rotary electric motor, id is a d-axis component of said armature current and iq is a q-axis component of said armature current, n is a number of pole pairs of said rotary electric motor, and T is a torque.

* * * * *